United States Patent
Lee et al.

(10) Patent No.: US 12,392,046 B2
(45) Date of Patent: Aug. 19, 2025

(54) CATALYST FOR HYDROGEN EVOLUTION REACTION AND PREPARING METHOD OF THE SAME

(71) Applicants: RESEARCH & BUSINESS FOUNDATION SUNGKYUNKWAN UNIVERSITY, Suwon-si (KR); INSTITUTE FOR BASIC SCIENCE, Daejeon (KR)

(72) Inventors: Hyoyoung Lee, Uiwang-si (KR); Yang Liu, Suwon-si (KR)

(73) Assignees: Research & Business Foundation Sungkyunkwan University, Suwon-si (KR); INSTITUTE FOR BASIC SCIENCE, Daejeon (KR)

( * ) Notice: Subject to any disclaimer, the term of this patent is extended or adjusted under 35 U.S.C. 154(b) by 456 days.

(21) Appl. No.: 17/585,021

(22) Filed: Jan. 26, 2022

(65) Prior Publication Data

US 2022/0243343 A1  Aug. 4, 2022

(30) Foreign Application Priority Data

Feb. 2, 2021  (KR) .................. 10-2021-0014467

(51) Int. Cl.
 *C25B 11/093* (2021.01)
 *C25B 1/04* (2021.01)
 *C25B 9/17* (2021.01)

(52) U.S. Cl.
 CPC .............. *C25B 11/093* (2021.01); *C25B 1/04* (2013.01); *C25B 9/17* (2021.01)

(58) Field of Classification Search
 CPC ...................................................... C25B 1/04
 See application file for complete search history.

(56) References Cited

FOREIGN PATENT DOCUMENTS

KR    10-2016-0131260 A    11/2016

OTHER PUBLICATIONS

Lu et al ("Engineering Platinum-Oxygen Dual Catalytic Sites via Charge Transfer towards Highly Efficient Hydrogen Evolution", Angewandte Chemie, vol. 132, Issue 40, Sep. 28, 2020, pp. 17865-17871). (Year: 2020).*
Borresen et al ("Hydrogen evolution on RuxTi1-xO2 in 0.5 M H2SO4", Electrochimica Acta, 47, 2002, 1819-1827) (Year: 2002).*
PubChem ("Ruthenium(2+)", 2024) (Year: 2024).*
Shinde et al ("In Situ Dynamic Nanostructuring of the Cu-Ti Catalyst-Support System Promotes Hydrogen Evolution under Alkaline Conditions", ACS Appl. Mater. Interfaces, 2018, 10, 29583-29592) (Year: 2018).*
Nix ("2.2: How do Molecules Bond to Surfaces?" , Physical & Theoretical Chemistry, Libre Text, 2022) (Year: 2022).*
Montemore et al ("O2 Activation by Metal Surfaces: Implications for Bonding and Reactivity on Heterogeneous Catalysts", Chem. Rev., 2018, 118, 2816-2862). (Year: 2018).*

(Continued)

*Primary Examiner* — Alexander W Keeling
(74) *Attorney, Agent, or Firm* — NSIP Law

(57) ABSTRACT

The present application relates to a catalyst for hydrogen evolution reaction (HER) including a transition metal matrix and noble metal atoms formed in the transition metal matrix, in which the noble metal atoms have oxygen adsorbed thereto, and oxygen is derived from the transition metal matrix.

19 Claims, 22 Drawing Sheets

(56) References Cited

OTHER PUBLICATIONS

Park, Jinkyu et al., "Investigation of the Support Effect in Atomically Dispersed Pt on WO3-x for Utilization of Pt in the Hydrogen Evolution Reaction," A Journal of the German Chemical Society, Nov. 4, 2019, (pp. 16038-16042).

Peng, Xianyun et al., "Trifunctional Single-Atomic Ru Sites Enable Efficient Overall Water Splitting and Oxygen Reduction in Acidic Media," Nano Micro Small Journal, Jul. 14, 2020, (67 Pages in English).

* cited by examiner

[FIG.1A]
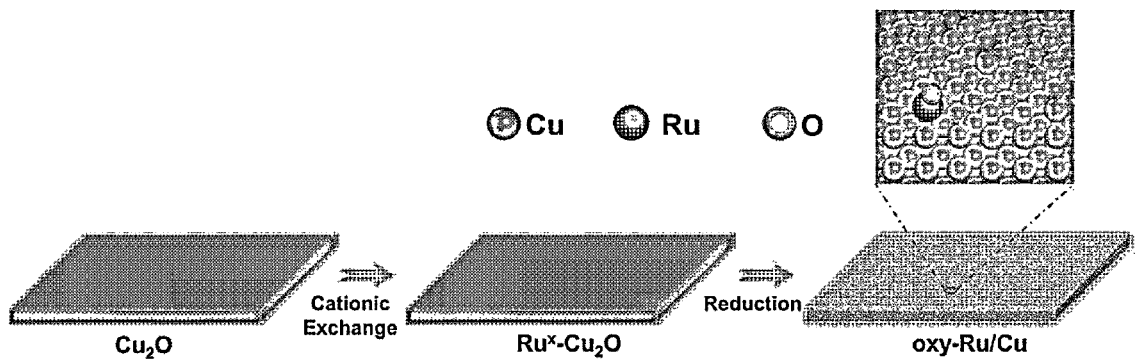

[FIG.1B]
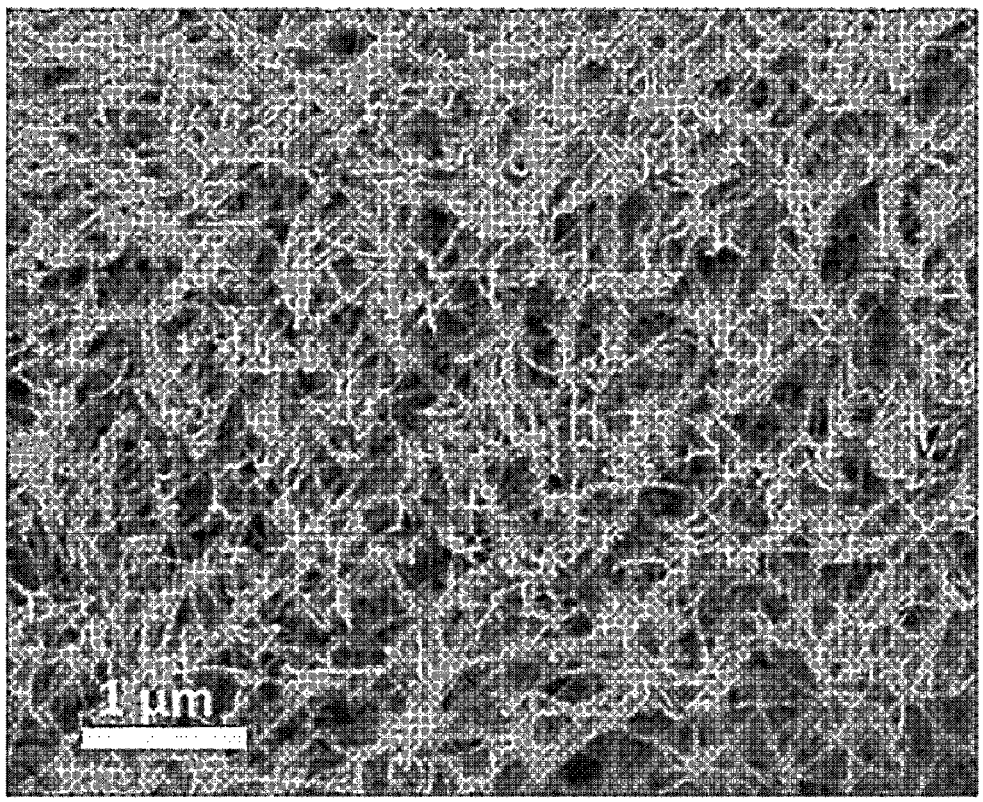

[FIG.1C]
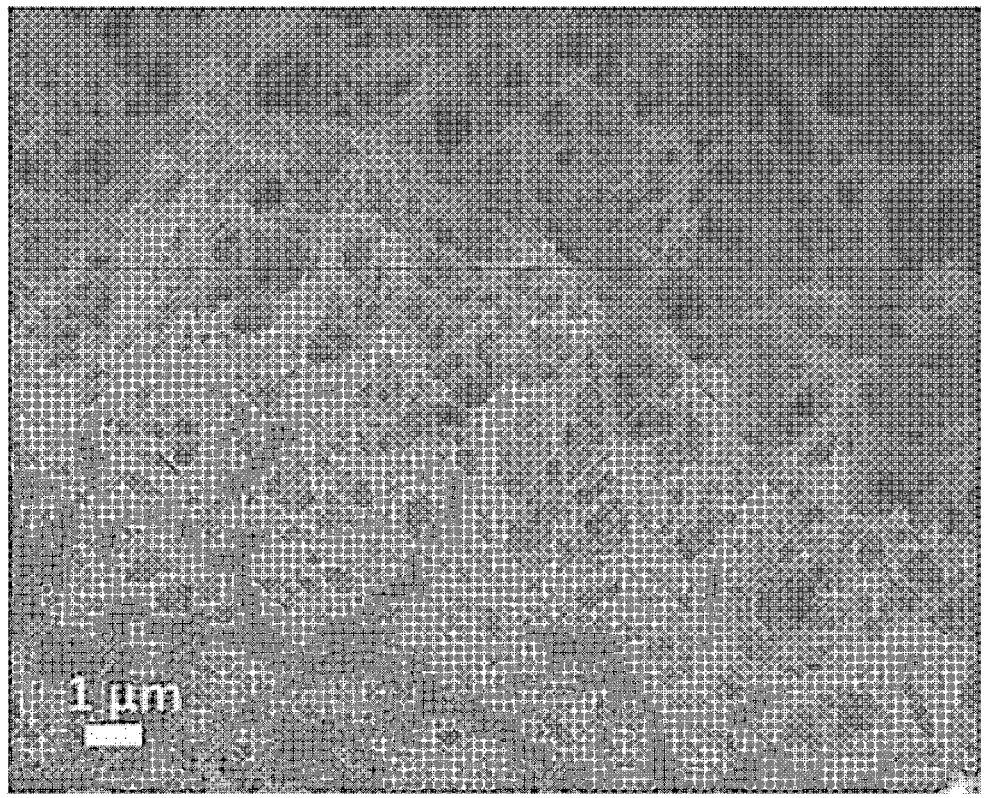

[FIG.1D]
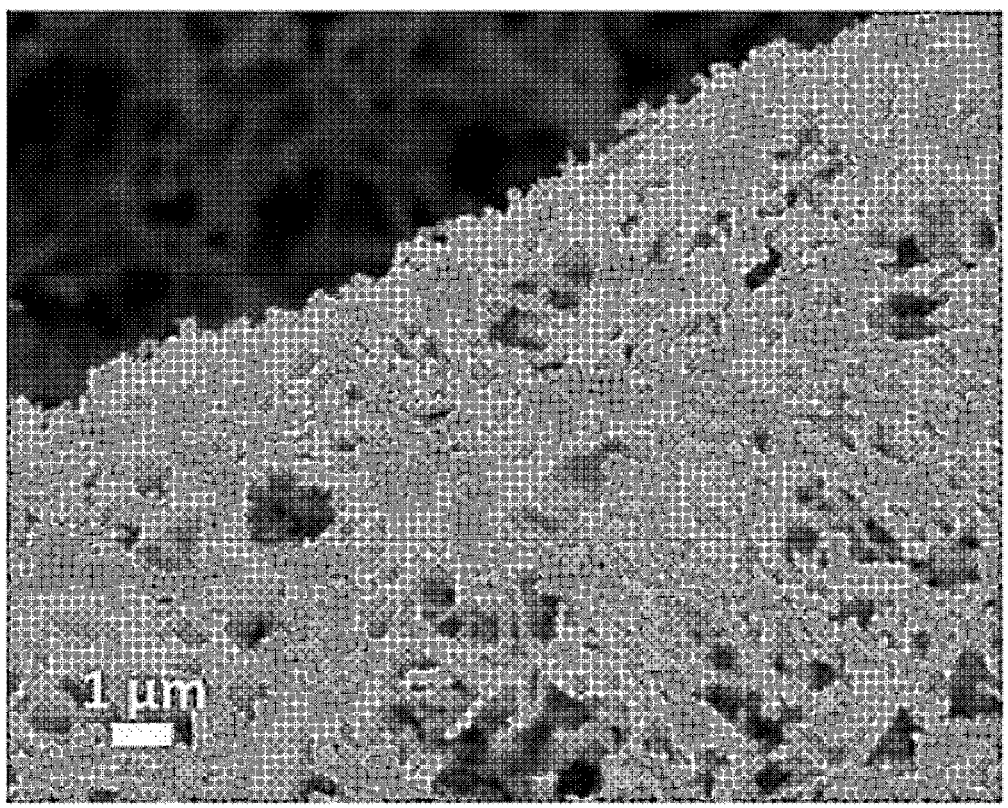

[FIG.1E]
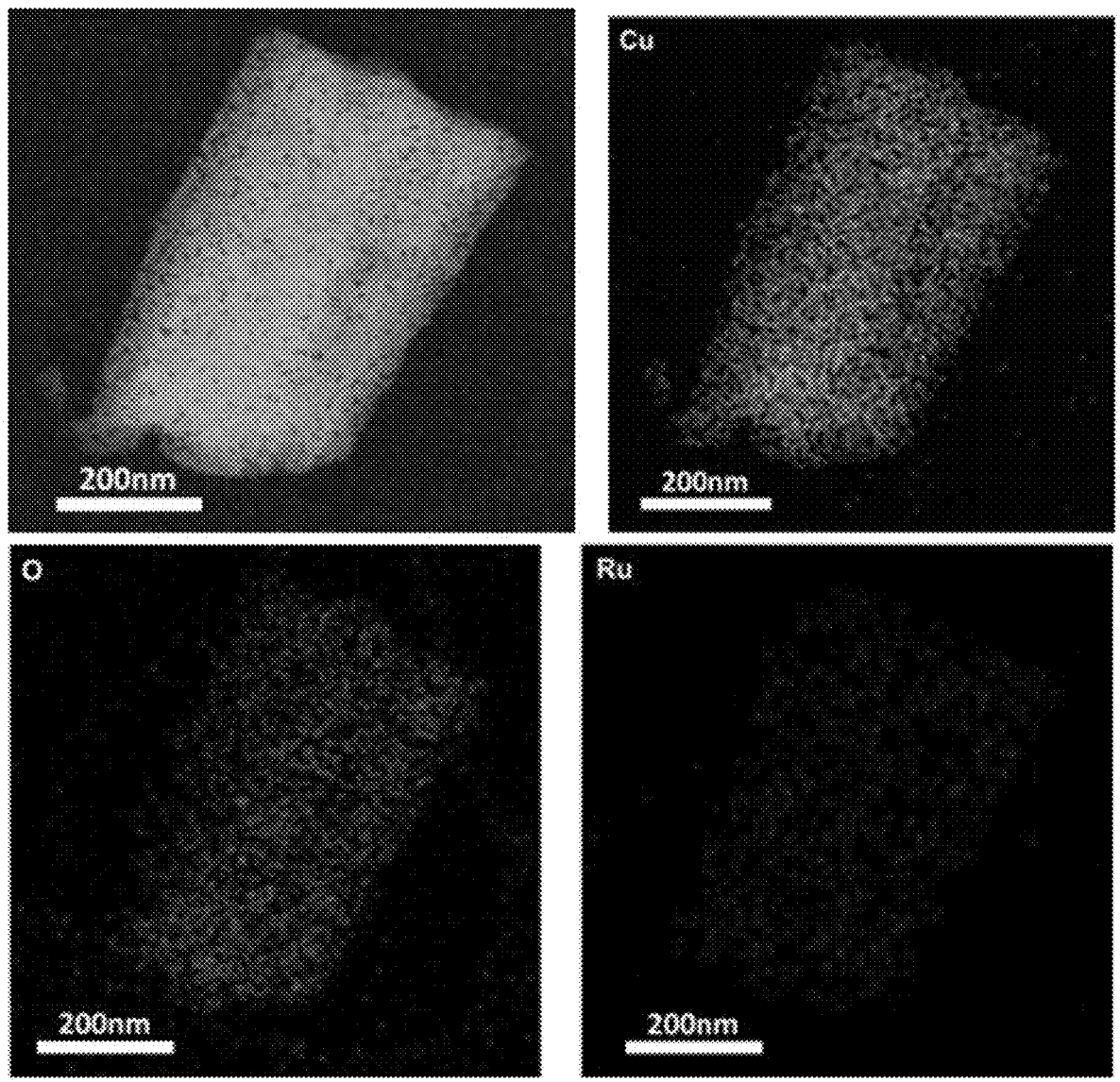

FIG. 2a
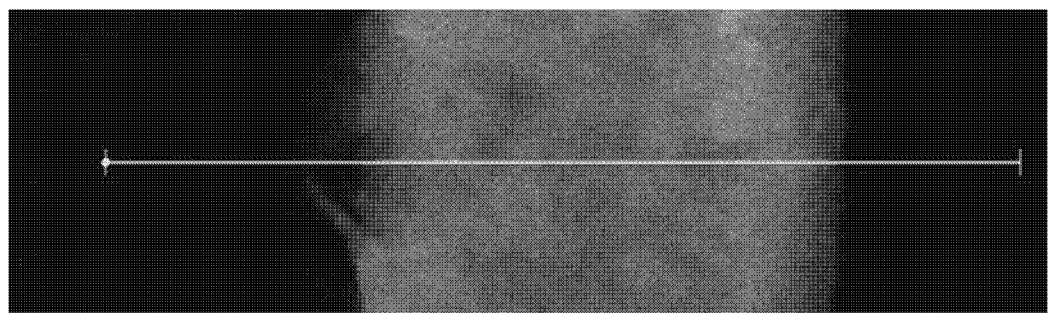
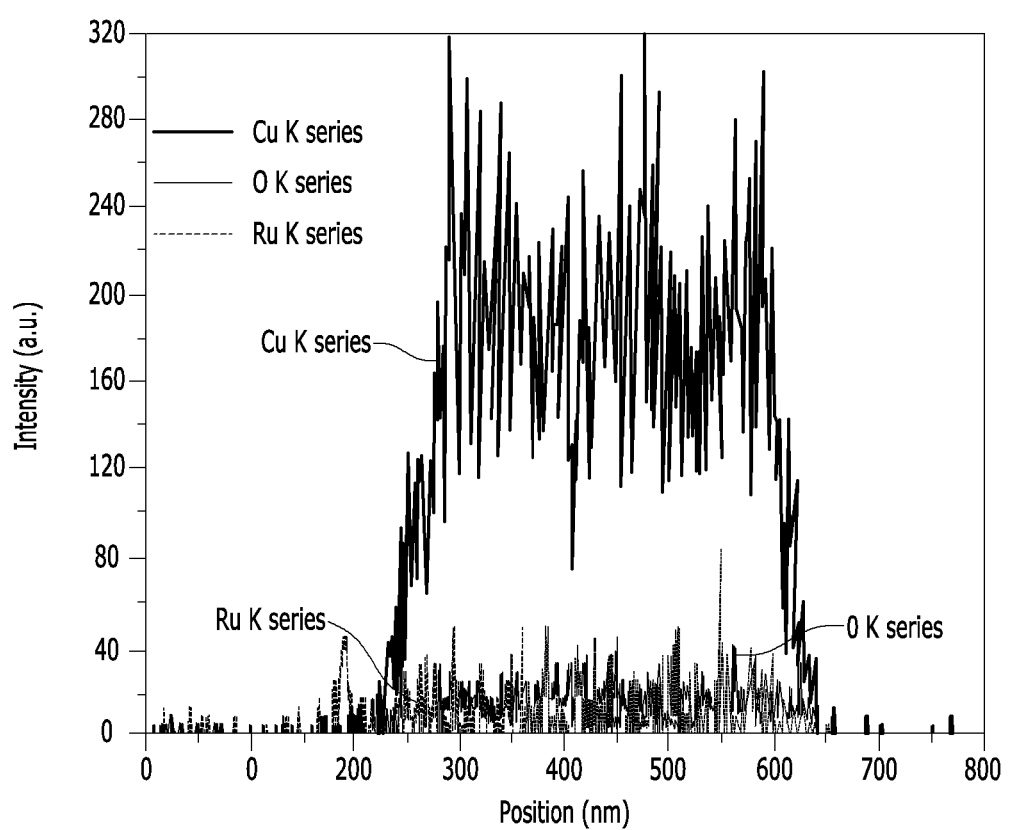

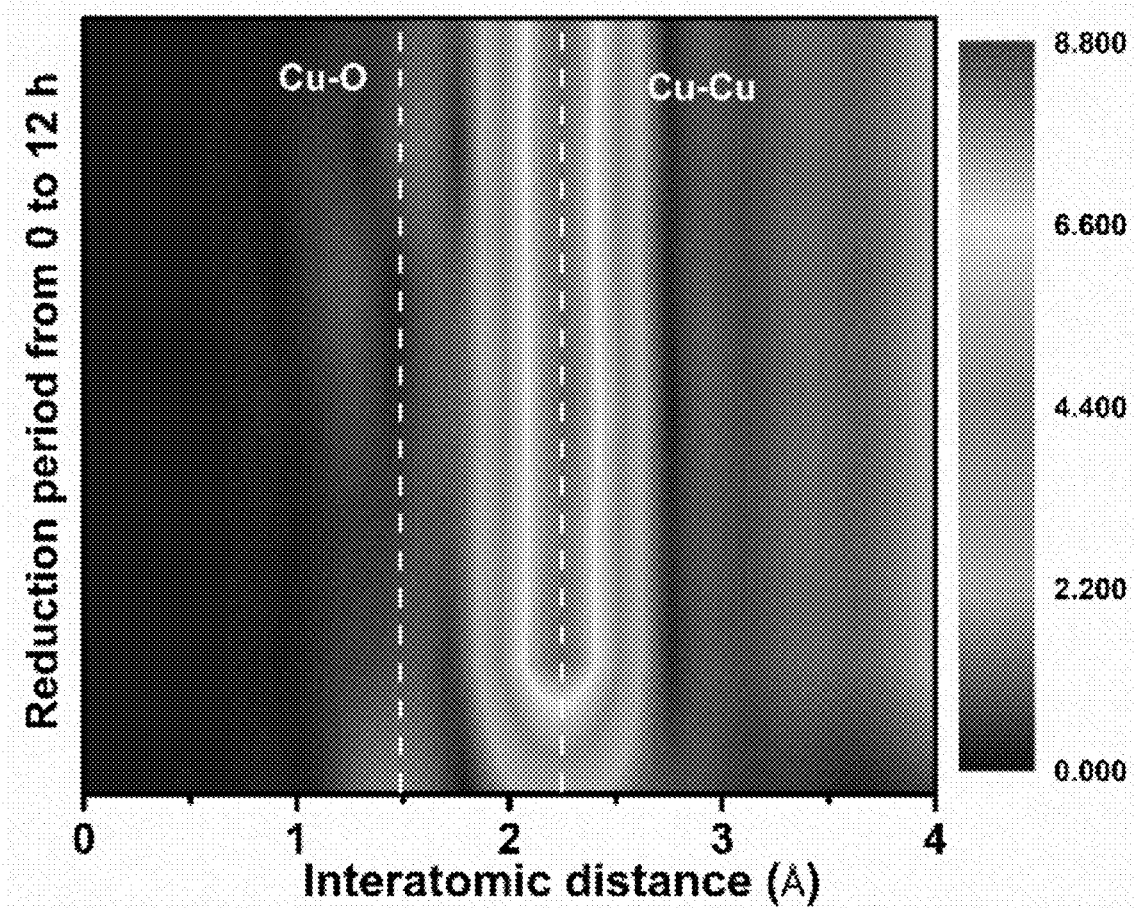
[FIG.3C]

[FIG.3F]
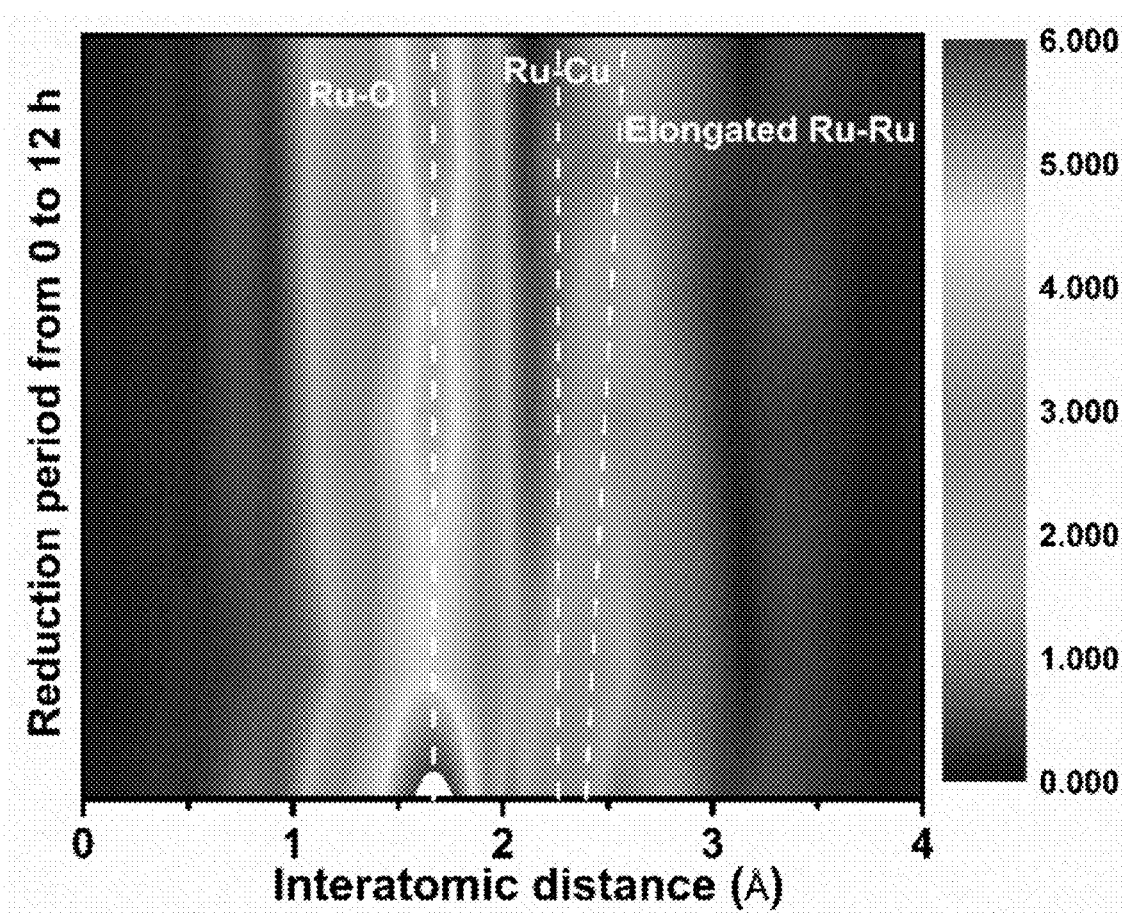

CATALYST FOR HYDROGEN EVOLUTION REACTION AND PREPARING METHOD OF THE SAME

CROSS-REFERENCE TO RELATED APPLICATIONS

This application claims the priority of Korean Patent Application No. 10-2021-0014467 filed on Feb. 2, 2021, in the Korean Intellectual Property Office, the disclosure of which is incorporated herein by reference.

FIELD

The present application relates to a catalyst for hydrogen evolution reaction and a method for preparing the same.

DESCRIPTION OF THE RELATED ART

As an alternative energy source, there is a fuel cell in which hydrogen and oxygen are reacted to obtain water and energy. A fuel cell is a device that generates energy by electrochemically reacting fuel and an oxidizing agent. In general, hydrogen is used as a fuel and oxygen is used as an oxidizing agent.

The fuel cell has a very high power generation efficiency of 40% to 80%, generates less noise during power generation, and requires a small area for power generation. Above all, the by-product of the reaction is water so that it is harmless to the environment. Accordingly, the fuel cell is attracting attention as a next-generation energy device.

In order to commercialize the fuel cell as described above, it is necessary to efficiently supply hydrogen and oxygen which are reactants. A common method for obtaining hydrogen and oxygen is to electrolyze water. Accordingly, the need for research on electrode catalysts for efficiently electrolyzing water is emerging.

However, conventional research on excellent HER catalysts has been focused on noble metals such as platinum and palladium, and there is a limitation in that these are very expensive.

Korean Patent Laid-Open Gazette No. 10-2016-0131260, which is the background technology of the present application, relates to a method for manufacturing a heterojunction anisotropic nanostructure and a nanostructure thereby, and specifically to a method for manufacturing a heterojunction anisotropic nanostructure in which two types of semiconductor materials exist in the nanostructure while maintaining the structure of the nanostructure by applying a new cation exchange method to the anisotropic nanostructure, and a nanostructure thereby. However, a catalyst for hydrogen evolution reaction, including noble metal atoms to which oxygen formed on a transition metal matrix is adsorbed, has not been disclosed.

CONTENT OF THE INVENTION

Problem to be Solved

The present application is to solve the aforementioned problems of the conventional art, and an object of the present application is to provide a catalyst for hydrogen evolution reaction (HER) and a method for preparing the same.

Further, the other object of the present application is to provide a water splitting system including the catalyst for hydrogen evolution reaction (HER).

However, the technical tasks to be achieved by the example of the present application are not limited to the technical tasks as described above, and other technical tasks may exist.

Problem Solving Means

As a technical means for achieving the above-mentioned technical tasks, a first aspect of the present application provides a catalyst for hydrogen evolution reaction (HER), which includes a transition metal matrix and noble metal atoms formed in the transition metal matrix, in which the noble metal atoms have oxygen adsorbed thereto, and oxygen is derived from the transition metal matrix.

According to an embodiment of the present application, the transition metal matrix may be produced by reducing a transition metal oxide, and oxygen may be adsorbed on the noble metal atoms in the reduction process, but the present application is not limited thereto.

According to an embodiment of the present application, the noble metal atoms may have hydrogen spillover occurring on the hetero-interface thereof, but the present application is not limited thereto.

According to an embodiment of the present application, the transition metal matrix may have a lattice structure, and the noble metal atoms may be introduced into the lattice structure, but the present application is not limited thereto.

According to an embodiment of the present application, the transition metal matrix may include a metal oxide selected from the group consisting of $Cu_2O$, $CuO$, $SnO_2$, $SnO$, $Fe_2O$, $Fe_2O_3$, $Fe_3O_4$, $FeO(OH)$, $Al_2O_3$, $NiO$, $TiO$, $TiO_2$, $WO_3$, $PbO$, $PbO_2$, $Pb_3O_4$, $ZnO$, $Sb_2O_3$, $Sb_2O_4$, $Sb_2O_5$, $Bi_2O_3$, $V_2O_3$, $V_2O_4$, $V_2O_5$, $MnO$, $Mn_3O_4$, $Mn_2O_3$, $MnO_2$, $CrO_2$, $Cr_2O_3$, $CrO_3$, $CoO$, $Co_3O$, $ZrO_2$, $Ga_2O_3$, $In_2O_3$, and combinations thereof, but the present application is not limited thereto.

According to an embodiment of the present application, the transition metal matrix may include a nanostructure selected from the group consisting of nanowires, nanorods, nanoplates, nanotubes, nanowires, and combinations thereof, but the present application is not limited thereto.

According to an embodiment of the present application, the noble metal may include one selected from the group consisting of ruthenium (Ru), gold (Au), silver (Ag), platinum (Pt), palladium (Pd), iridium (Ir), rhodium (Rh), osmium (Os), and combinations thereof, but the present application is not limited thereto.

A second aspect of the present application provides a method for preparing a catalyst for hydrogen evolution reaction (HER), including the steps of immersing a transition metal matrix in a noble metal chloride solution, preparing an intermediate by exchanging noble metal cations of the noble metal chloride solution with a portion of metal cations of the transition metal matrix, immersing the intermediate in a solution containing a reducing agent, and forming noble metal atoms to which oxygen is adsorbed on the transition metal matrix by moving oxygen of the transition metal matrix to noble metal atoms by the reducing agent.

According to an embodiment of the present application, the reducing agent may include one selected from the group consisting of $NaBH_4$, $LiAlH_4$, hydrazine, $KBH_4$, hydroiodic acid, and combinations thereof, but the present application is not limited thereto.

According to an embodiment of the present application, the transition metal matrix may be one that is produced by reducing a transition metal oxide, and in which oxygen is adsorbed on the noble metal atoms in the reduction process, but the present application is not limited thereto.

According to an embodiment of the present application, the noble metal atoms may have hydrogen spillover occurring on the hetero-interface thereof, but the present application is not limited thereto.

According to an embodiment of the present application, the transition metal matrix may have a lattice structure, and the noble metal atoms may be introduced into the lattice structure, but the present application is not limited thereto.

According to an embodiment of the present application, the transition metal matrix may include a metal oxide selected from the group consisting of $Cu_2O$, $CuO$, $SnO_2$, $SnO$, $Fe_2O$, $Fe_2O_3$, $Fe_3O_4$, $FeO(OH)$, $Al_2O_3$, $NiO$, $TiO$, $TiO_2$, $WO_3$, $PbO$, $PbO_2$, $Pb_3O_4$, $ZnO$, $Sb_2O_3$, $Sb_2O_4$, $Sb_2O_5$, $Bi_2O_3$, $V_2O_3$, $V_2O_4$, $V_2O_5$, $MnO$, $Mn_3O_4$, $Mn_2O_3$, $MnO_2$, $CrO_2$, $Cr_2O_3$, $CrO_3$, $CoO$, $Co_3O$, $ZrO_2$, $Ga_2O_3$, $In_2O_3$, and combinations thereof, but the present application is not limited thereto.

According to an embodiment of the present application, the transition metal matrix may include a nanostructure selected from the group consisting of nanowires, nanorods, nanoplates, nanotubes, nanowires, and combinations thereof, but the present application is not limited thereto.

According to an embodiment of the present application, the noble metal may include one selected from the group consisting of ruthenium (Ru), gold (Au), silver (Ag), platinum (Pt), palladium (Pd), iridium (Ir), rhodium (Rh), osmium (Os), and combinations thereof, but the present application is not limited thereto.

A third aspect of the present application provides a water splitting system including the catalyst for hydrogen evolution reaction (HER) according to the first aspect of the present application.

The above-described problem solving means are merely exemplary, and should not be construed as an intention of limiting the present application. In addition to the exemplary embodiments described above, additional embodiments may exist in the drawings and detailed description of the invention.

Effects of the Invention

There have been limitations in that conventional research on excellent HER catalysts has been focused on noble metals such as platinum and palladium, and they are very expensive. However, according to the above-described problem solving means of the present application, the catalyst for hydrogen evolution reaction (HER) according to the present application may provide a catalyst for hydrogen evolution reaction that is economical and shows excellent HER performance, based on an inexpensive metal source, by substituting only some metal ions with noble metals having oxygen adsorbed thereto through a cation exchange strategy using a transition metal that is inexpensive and has the most abundant electrical conductivity, thereby functionalizing the metal ions substituted with the oxygen-absorbed noble metals.

Further, in the catalyst for hydrogen evolution reaction (HER) according to the present application, oxygen is adsorbed to noble metal atoms so that an electronic configuration may be modulated, and a scaling relationship of the noble metal atoms may be removed.

Further, the catalyst for hydrogen evolution reaction (HER) according to the present application has a high hydrogen evolution rate since hydrogen spillover occurs on the hetero-interface of the noble metal atoms.

Further, the catalyst for hydrogen evolution reaction (HER) according to the present application can be rapidly moved to the transition metal matrix lattice in which active hydrogens provide abundant active sites of hydrogen bonding due to the presence of the hetero-interface of the atoms.

Further, since the method for preparing the catalyst for hydrogen evolution reaction (HER) according to the present application enables the catalyst to be prepared in a simple process using a cation exchange strategy, the production process can be simplified, the catalyst can be prepared even at low cost, the mass production is easy, and economic feasibility can be excellent.

However, the effects obtainable in the present application are not limited to the effects as described above, and another effect may exist.

BRIEF DESCRIPTION OF THE DRAWINGS

The above and other aspects, features, and other advantages of the present disclosure will be more clearly understood from the following detailed description taken in conjunction with the accompanying drawings, in which:

FIG. 1 is a preparation process schematic diagram and SEM images of a catalyst for hydrogen evolution reaction (HER) according to an embodiment of the present application;

DETAILED DESCRIPTION OF THE EMBODIMENT

Figure 2C:
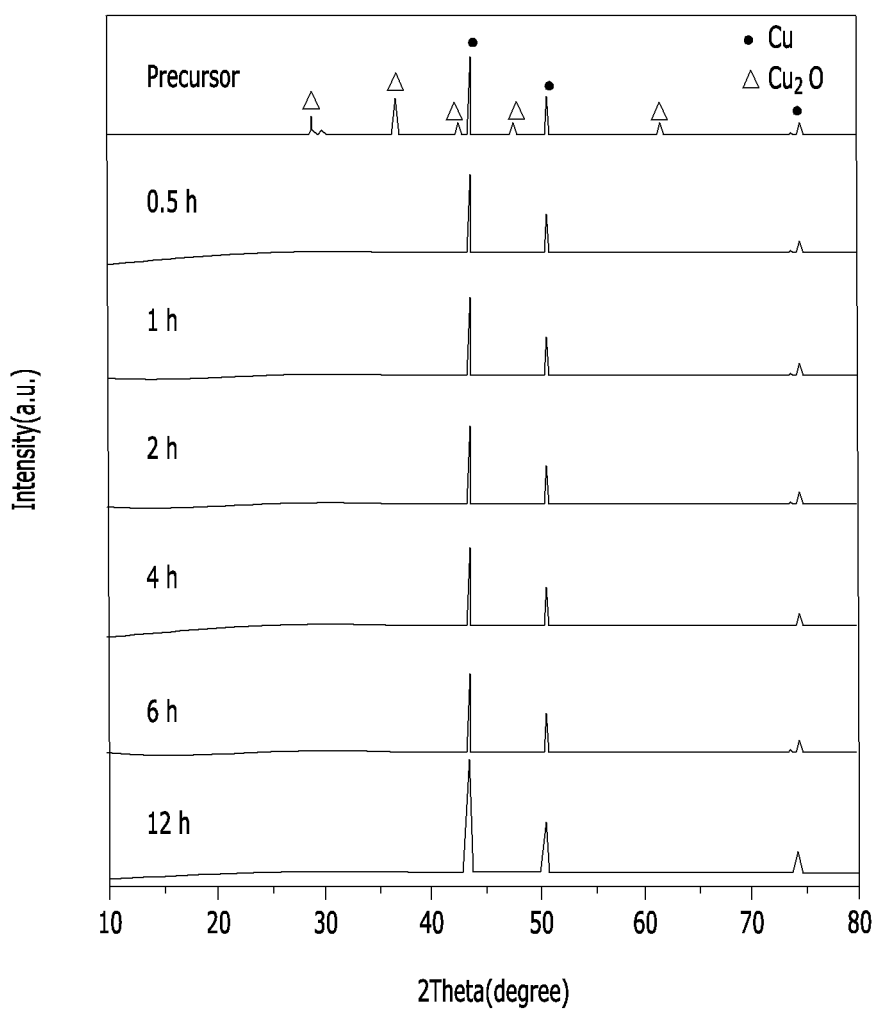
FIG. 2 is a transmission electron microscope (TEM) image, energy dispersive X-ray spectroscopy (EDS) line scan profiles, a high-resolution transmission electron microscopy (HR TEM) image, and graphs showing X-ray diffraction (XRD) and X-ray photoelectron spectroscopy (XPS) spectra of a catalyst for hydrogen evolution reaction (HER) according to an example of the present application.

Hereinafter, embodiments of the present application will be described in detail with reference to the accompanying drawings so that those with ordinary skill in the art to which the present application pertains will easily be able to implement the present application.

However, the present application may be implemented in different forms and is not limited to the embodiments described herein. Further, parts irrelevant to the description are omitted in order to clearly describe the present application in the drawings, and similar reference numerals are attached to similar parts throughout the specification.

In the whole specification of the present application, when a part is said to be "connected" with other parts, it not only includes a case that the part is "directly connected" to the other parts but also includes a case that the part is "electrically connected" to the other parts with another element being interposed therebetween.

In the whole specification of the present application, when any member is positioned "on", "over", "above", "beneath", "under", and "below" other members, this not only includes a case that the any member is brought into contact with the other members, but also includes a case that another member exists between two members.

In the whole specification of the present application, if a prescribed part "includes" a prescribed element, this means that another element may be further included instead of excluding other elements unless any particularly opposite description exists.

When unique manufacture and material allowable errors of numerical values are suggested to mentioned meanings of terms of degrees used in the present specification such as "about", "substantially", etc., the terms of degrees are used in the numerical values or as a meaning near the numerical values, and the terms of degrees are used to prevent that an unscrupulous infringer unfairly uses a disclosure content in which exact or absolute numerical values are mentioned to help understanding of the present application. Further, in the whole specification of the present application, "a step to do ~" or "a step of ~" does not mean "a step for ~".

In the whole specification of the present application, a term of "a combination thereof" included in a Markush type expression, which means a mixture or combination of one or more selected from the group consisting of constituent elements described in the Markush type expression, means including one or more selected from the group consisting of the constituent elements.

In the whole specification of the present application, description of "A and/or B" means "A or B, or, A and B".

Hereinafter, a catalyst for hydrogen evolution reaction according to the present application and a method for preparing the same will be described in detail with reference to embodiments, examples, and drawings. However, the present application is not limited to such embodiments, examples, and drawings.

As a technical means for achieving the above-mentioned technical tasks, the first aspect of the present application provides a catalyst for hydrogen evolution reaction (HER), which includes a transition metal matrix and noble metal atoms formed in the transition metal matrix, in which the noble metal atoms have oxygen adsorbed thereto, and oxygen is derived from the transition metal matrix.

There have been limitations in that conventional research on excellent HER catalysts has been focused on noble metals such as platinum and palladium, and they are very expensive. However, according to the above-described problem solving means of the present application, the catalyst for hydrogen evolution reaction (HER) according to the present application may provide a catalyst for hydrogen evolution reaction that is economical and shows excellent HER performance, based on an inexpensive metal source, by substituting only some metal ions with noble metals having oxygen adsorbed thereto through a cation exchange strategy using a transition metal that is inexpensive and has the most abundant electrical conductivity, thereby functionalizing the metal ions substituted with the oxygen-absorbed noble metals.

Further, in the catalyst for hydrogen evolution reaction (HER) according to the present application, oxygen is adsorbed to noble metal atoms so that an electronic configuration may be modulated, and a scaling relationship of the noble metal atoms may be removed.

Further, the noble metals after oxygen adsorption of the catalyst for hydrogen evolution reaction (HER) according to the present application may also modulate oxophilicity so that regeneration of active sites is favored in addition to excellent performance in water separation.

According to an embodiment of the present application, the transition metal matrix may be produced by reducing a transition metal oxide, and oxygen may be adsorbed on the noble metal atoms in the reduction process, but the present application is not limited thereto.

That is, oxygen is derived from the transition metal matrix.

According to an embodiment of the present application, the noble metal atoms may have hydrogen spillover occurring on the hetero-interface thereof, but the present application is not limited thereto.

The catalyst for hydrogen evolution reaction (HER) according to the present application has a high hydrogen evolution rate by generating hydrogen spillover on the hetero-interface of the noble metal atoms. That is, hydrogen spillover that occurs at the atomic interface (e.g., Ru—Cu) accelerates hydrogen evolution with a low energy barrier.

According to an embodiment of the present application, the transition metal matrix may have a lattice structure, and the noble metal atoms may be introduced into the lattice structure, but the present application is not limited thereto.

The catalyst for hydrogen evolution reaction (HER) according to the present application may be rapidly moved to the transition metal matrix lattice in which active hydrogens provide abundant active sites of hydrogen bonding due to the presence of the hetero-interface of the atoms.

According to an embodiment of the present application, the transition metal matrix may include a metal oxide selected from the group consisting of $Cu_2O$, $CuO$, $SnO_2$, $SnO$, $Fe_2O$, $Fe_2O_3$, $Fe_3O_4$, $FeO(OH)$, $Al_2O_3$, $NiO$, $TiO$, $TiO_2$, $WO_3$, $PbO$, $PbO_2$, $Pb_3O_4$, $ZnO$, $Sb_2O_3$, $Sb_2O_4$, $Sb_2O_5$, $Bi_2O_3$, $V_2O_3$, $V_2O_4$, $V_2O_5$, $MnO$, $Mn_3O_4$, $Mn_2O_3$, $MnO_2$, $CrO_2$, $Cr_2O_3$, $CrO_3$, $CoO$, $Co_3O$, $ZrO_2$, $Ga_2O_3$, $In_2O_3$, and combinations thereof, but the present application is not limited thereto.

For example, the transition metal matrix may include a $Cu_2O$ metal oxide, but the present application is not limited thereto.

Among the various abundant metals, Cu is one of the most abundant and inexpensive three-dimensional metals with high electrical conductivity. However, there is a limitation in that the ability of water dissociation and hydrogen adsorption-desorption in any electrolyte among the electrolytes is somewhat inferior due to the d10 electron configuration.

Meanwhile, as will be described later, although Ru, a typical noble metal, has excellent adsorption and dissociation abilities for water molecules, there are limitations in that it always has a limited HER activity due to excessive adsorption (scale relationship) of hydrogen and hydroxide, and has a high cost.

As will be described later, the catalyst for hydrogen evolution reaction (HER) according to the present application is to provide, for example, an electrocatalyst for hydrogen evolution reaction having a composition of oxy-Ru/Cu by substituting some copper ions in copper oxide ($Cu_2O$) on a copper oxide structure with oxy-ruthenium using a cation exchange technique.

That is, copper (Cu), one of the most abundant transition metals with high electrical conductivity, is selected to form atomic contact with oxy-Ru through a cation exchange strategy in the oxy state, thereby providing oxy-Ru/Cu.

Therefore, the catalyst for hydrogen evolution reaction (HER) according to the present application may exhibit excellent HER activity by only substituting some copper ions with ruthenium (Ru) which shows significant efficiency in HER based on an abundant and inexpensive copper metal with high electrical conductivity that does not correspond to a noble metal. Accordingly, it may be possible to provide a catalyst significantly cheaper than the conventional catalyst for water electrolysis.

According to an embodiment of the present application, the transition metal matrix may include a nanostructure selected from the group consisting of nanowires, nanorods, nanoplates, nanotubes, nanowires, and combinations thereof, but the present application is not limited thereto.

For example, the transition metal matrix may include nanowires, but the present application is not limited thereto.

According to an embodiment of the present application, the noble metal may include one selected from the group consisting of ruthenium (Ru), gold (Au), silver (Ag), platinum (Pt), palladium (Pd), iridium (Ir), rhodium (Rh), osmium (Os), rhenium (Re), tungsten (W), molybdenum (Mo), and combinations thereof, but the present application is not limited thereto.

For example, the noble metal may include ruthenium (Ru), but the present application is not limited thereto.

Although Ru, a typical noble metal, has excellent adsorption and dissociation abilities for water molecules, there are limitations in that it always has a limited HER activity due to excessive adsorption (scale relationship) of hydrogen and hydroxide, and has a high cost.

The second aspect of the present application provides a method for preparing a catalyst for hydrogen evolution reaction (HER), including the steps of immersing a transition metal matrix in a noble metal chloride solution, preparing an intermediate by exchanging noble metal cations of the noble metal chloride solution with a portion of metal cations of the transition metal matrix, immersing the intermediate in a solution containing a reducing agent, and forming noble metal atoms to which oxygen is adsorbed on the transition metal matrix by moving oxygen of the transition metal matrix to noble metal atoms by the reducing agent.

With respect to the method for preparing the catalyst for hydrogen evolution reaction (HER) of the second aspect of the present application, detailed descriptions of parts overlapping with the first aspect of the present application have been omitted, but even if the descriptions have been omitted, the contents described in the first aspect of the present application may be equally applied to the second aspect of the present application.

For example, the cation exchange strategy in the step of preparing the intermediate may be used in order to replace Cu atoms in 2O, and oxy-Ru/Cu may be obtained after the room conditions capable of adjusting the quantitative oxygen adsorption are reduced.

Since the method for preparing the catalyst for hydrogen evolution reaction (HER) according to the present application enables the catalyst to be prepared in a simple process using the cation exchange strategy, the production process may be simplified, the catalyst may be prepared even at low cost, the mass production is easy, and economic feasibility may be excellent.

The method for preparing the catalyst for hydrogen evolution reaction (HER) according to the present application is to provide, for example, an electrocatalyst for hydrogen evolution reaction having a composition of oxy-Ru/Cu by substituting some copper ions in copper oxide ($Cu_2O$) on a copper oxide structure with oxy-ruthenium using the cation exchange technique.

That is, copper (Cu), one of the most abundant transition metals with high electrical conductivity, is selected to form atomic contact with oxy-Ru through the cation exchange strategy in the oxy state, thereby providing oxy-Ru/Cu.

Therefore, the method for preparing the catalyst for hydrogen evolution reaction (HER) according to the present application may provide a catalyst which exhibits excellent HER activity by only substituting some copper ions with ruthenium (Ru) which shows significant efficiency in HER based on an abundant and inexpensive copper metal with a high electrical conductivity that does not correspond to noble metal. Accordingly, it may be possible to provide a catalyst significantly cheaper than the conventional catalyst for water electrolysis.

According to an embodiment of the present application, the reducing agent may include one selected from the group consisting of $NaBH_4$, $LiAlH_4$, hydrazine, $KBH_4$, hydroiodic acid, and combinations thereof, but the present application is not limited thereto.

For example, the reducing agent may include $NaBH_4$, but the present application is not limited thereto.

According to an embodiment of the present application, the transition metal matrix may be one which is produced by reducing a transition metal oxide, and in which oxygen is adsorbed on the noble metal atoms in the reduction process, but the present application is not limited thereto.

According to an embodiment of the present application, the noble metal atoms may have hydrogen spillover occurring on the hetero-interface thereof, but the present application is not limited thereto.

According to an embodiment of the present application, the transition metal matrix may have a lattice structure, and the noble metal atoms may be introduced into the lattice structure, but the present application is not limited thereto.

According to an embodiment of the present application, the transition metal matrix may include a metal oxide selected from the group consisting of $Cu_2O$, $CuO$, $SnO_2$, $SnO$, $Fe_2O$, $Fe_2O_3$, $Fe_3O_4$, $FeO(OH)$, $Al_2O_3$, $NiO$, $TiO$, $TiO_2$, $WO_3$, $PbO$, $PbO_2$, $Pb_3O_4$, $ZnO$, $Sb_2O_3$, $Sb_2O_4$, $Sb_2O_5$, $Bi_2O_3$, $V_2O_3$, $V_2O_4$, $V_2O_5$, $MnO$, $Mn_3O_4$, $Mn_2O_3$, $MnO_2$, $CrO_2$, $Cr_2O_3$, $CrO_3$, $CoO$, $Co_3O$, $ZrO_2$, $Ga_2O_3$, $In_2O_3$, and combinations thereof, but the present application is not limited thereto.

According to an embodiment of the present application, the transition metal matrix may include a nanostructure selected from the group consisting of nanowires, nanorods, nanoplates, nanotubes, nanowires, and combinations thereof, but the present application is not limited thereto.

According to an embodiment of the present application, the noble metal may include one selected from the group consisting of ruthenium (Ru), gold (Au), silver (Ag), platinum (Pt), palladium (Pd), iridium (Ir), rhodium (Rh), osmium (Os), and combinations thereof, but the present application is not limited thereto.

The third aspect of the present application provides a water splitting system including the catalyst for hydrogen evolution reaction (HER) according to the first aspect of the present application.

With respect to the water splitting system of the third aspect of the present application, detailed descriptions of parts overlapping with the first and second aspects of the present application have been omitted, but even if the descriptions have been omitted, the contents described in the first and second aspects of the present application may be equally applied to the third aspect of the present application.

Hereinafter, the present disclosure will be described in more detail through Examples, but the following Examples are for explanation purposes only and are not intended to limit the scope of the present application.

[EXAMPLE] PREPARATION OF AN OXY-RU/CU CATALYST

FIG. 1A is a preparation process schematic diagram of a catalyst for hydrogen evolution reaction (HER) according to an embodiment of the present application.

Conductive skeletons were obtained using three-dimensional $Cu_2O$ in order to prepare catalysts with more active sites and high surface area.

Subsequently, the $Cu_2O$ foam was immersed in a Ru(II) chloride solution for 12 hours. At this time, Cu ions were partially replaced by Ru ions.

Subsequently, $Ru_x$—$Cu_2O$ underwent a chemical reduction in a fresh sodium borate solution ($NaBH_4$) in order to allow oxygen-adsorbed Ru atoms to be included in the lattice of Cu. The gradient reduction period was systematically investigated (0 hour to 12 hours) in order to adjust the oxygen range in Ru.

Experimental Example 1

FIGS. 1B to 1D are SEM images of $Cu_2O$ (FIG. 1B), $Ru_x$—$Cu_2O$ (FIG. 1C), and oxy-Ru/Cu (FIG. 1D) of the catalyst for hydrogen evolution reaction (HER) according to an example of the present application.

FIG. 1E is SEM elemental mapping images of oxy-Ru/Cu nanorods after 1 hour of reduction.

Through this, $Cu_2O$ exhibited the form of nanowires, and it could be confirmed that the cationic exchange process as follows was remained as this unique 3D framework. However, a lot of hydrogen gas is generated due to the strong chemical reaction of $NaBH_4$ and water, thereby reducing Cu(+1) to Cu(0) in the field so that the nanowires are partially destroyed. Although new nanoparticles are produced and fixed to the nanowires, it could be confirmed that the element distribution in which ruthenium oxide was not present was uniform.

Experimental Example 2

FIG. 2 is a TEM image, EDS line scan profiles, a HRTEM image, and graphs showing XRD and XPS spectra of a catalyst for hydrogen evolution reaction (HER) according to an example of the present application.

FIG. 2A is a TEM image and EDS line scan profiles of oxy-Ru/Cu after 1 hour of reduction.

FIG. 2B is an HR-TEM image of oxy-Ru/Cu after 1 hour of reduction.

FIG. 2C is a graph showing XRD spectra during an increasing reduction period of oxy-Ru/Cu.

Through this, the TEM element EDS scan profiles show that Cu is the largest component. It could be confirmed that Ru species were intermittently distributed on the Cu surface and O species showed similar signal intensity. Since the recognizable lattice space could be indexed with Cu(111) and alternative Ru atoms could be identified, it could be confirmed that the cation exchange combined with the reduction strategy succeeded in the production of oxy-Ru/Cu. Therefore, only the Cu crystal structure could be detected by XRD.

Figure 2D:
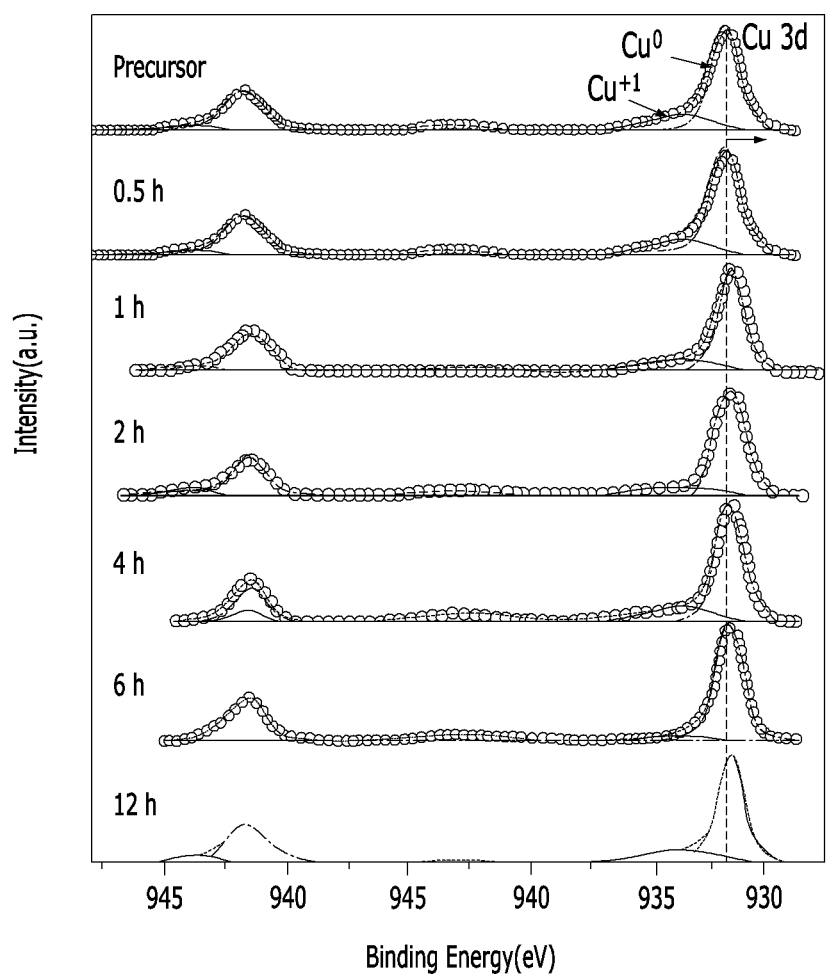
Figure 2E:
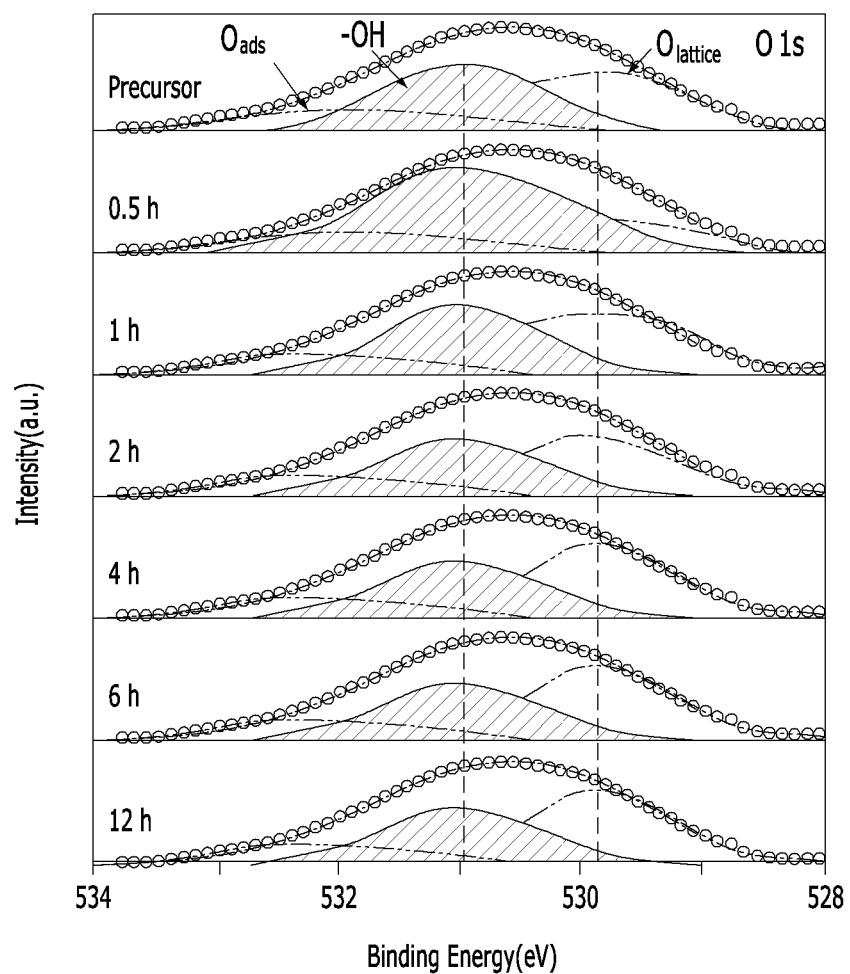
Figure 2F:
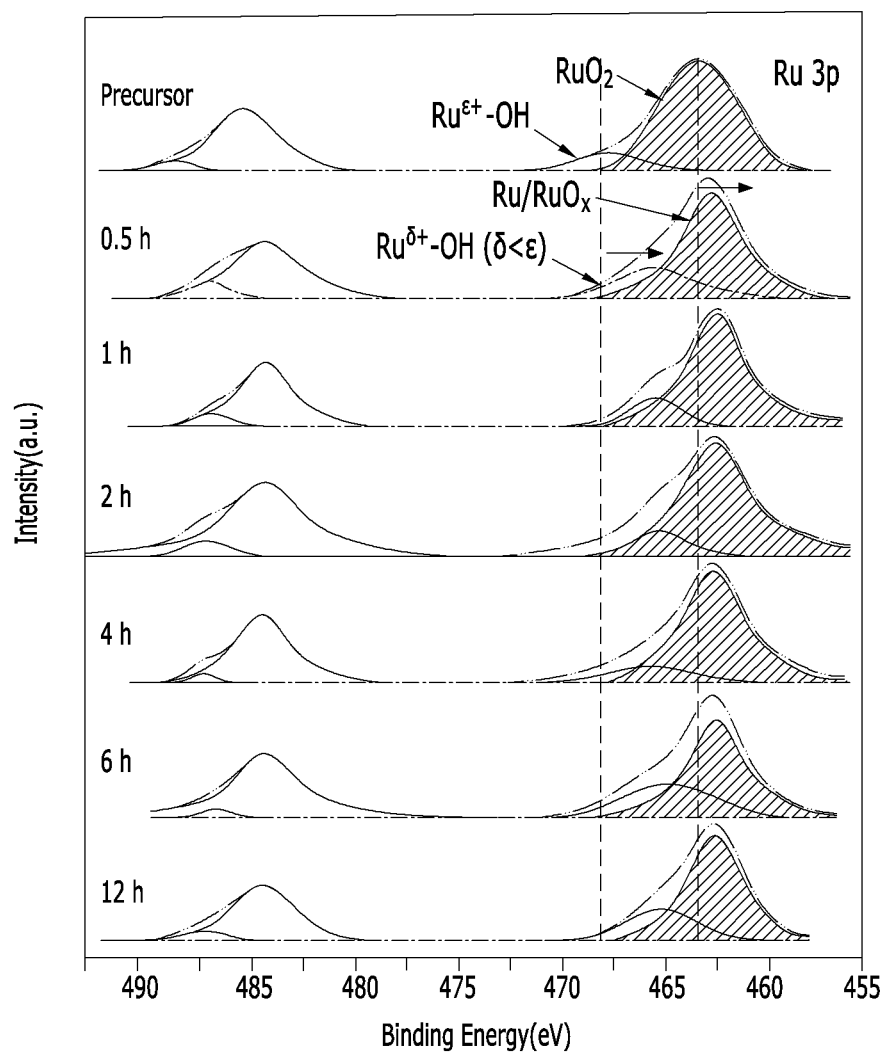

FIGS. 2D to 2F are graphs showing XPS spectra of Cu 3d (FIG. 2D), O1s (FIG. 2E), and Ru 3p (FIG. 2F) during an increasing reduction period of oxy-Ru/Cu.

Through this, it could be confirmed that the Cu 3d XPS spectra exhibited observed values similar to those of XRD. The predominant state was the metal stage, but the detectable oxide moieties even underwent a 12 hour reduction, and this means that the partial oxygen is tightly bound with the superficial Cu atoms. Therefore, lattice oxygen could be confirmed in the O1s XPS spectra. Further, it could be confirmed that —OH and OH remained even after the reduction due to the strong affinity of Ru reflecting Os absorbed into the Ru atom. Although Ru 3p XPS spectra were measured after 90 seconds of argon gas etching, the main component of the precursor was $RuO_2$, and this proves the reliability of cation exchange. After the reduction, this peak has a negative shift and belongs to the partial metallurgy of Ru in the lattice of Cu.

Experimental Example 3

FIG. 3 is graphs showing K-edge XANES spectra, FT spectra, and heat map images of a catalyst for hydrogen evolution reaction (HER) according to an embodiment of the present application.

Figure 3A:
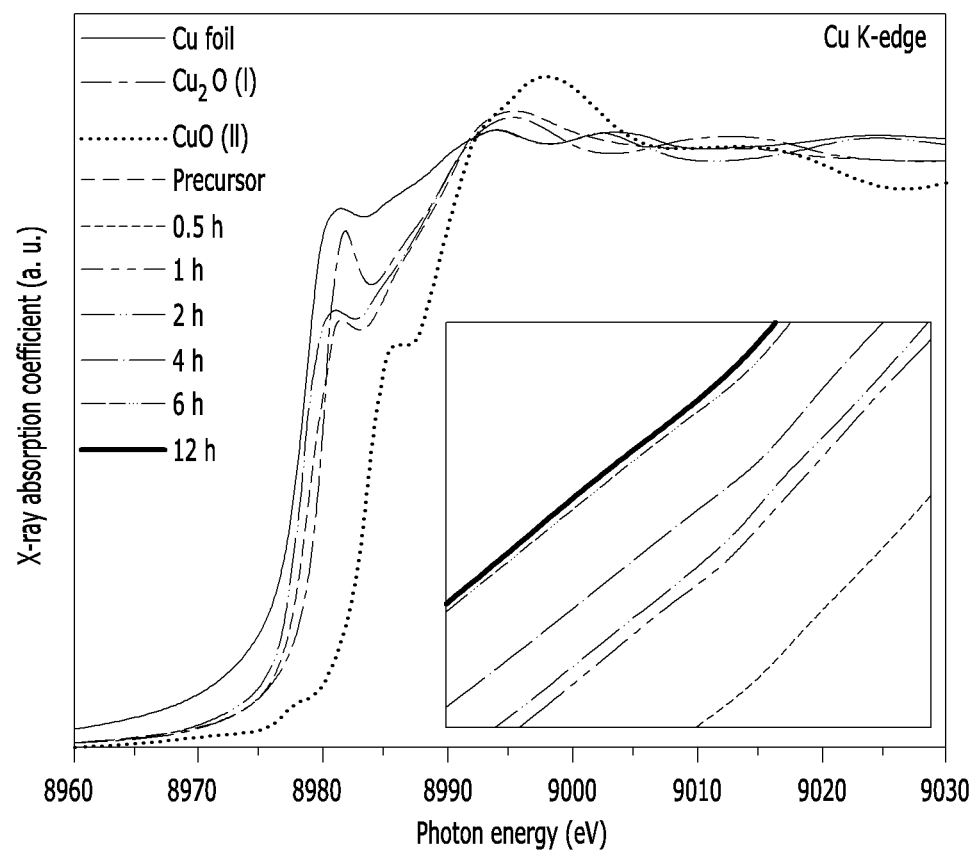
FIG. 3 is graphs showing K-edge X-ray absorption near edge structure (K-edge XANES) spectra, FT spectra, and heat map images of a catalyst for hydrogen evolution reaction (HER) according to an embodiment of the present application.
Figure 3B:
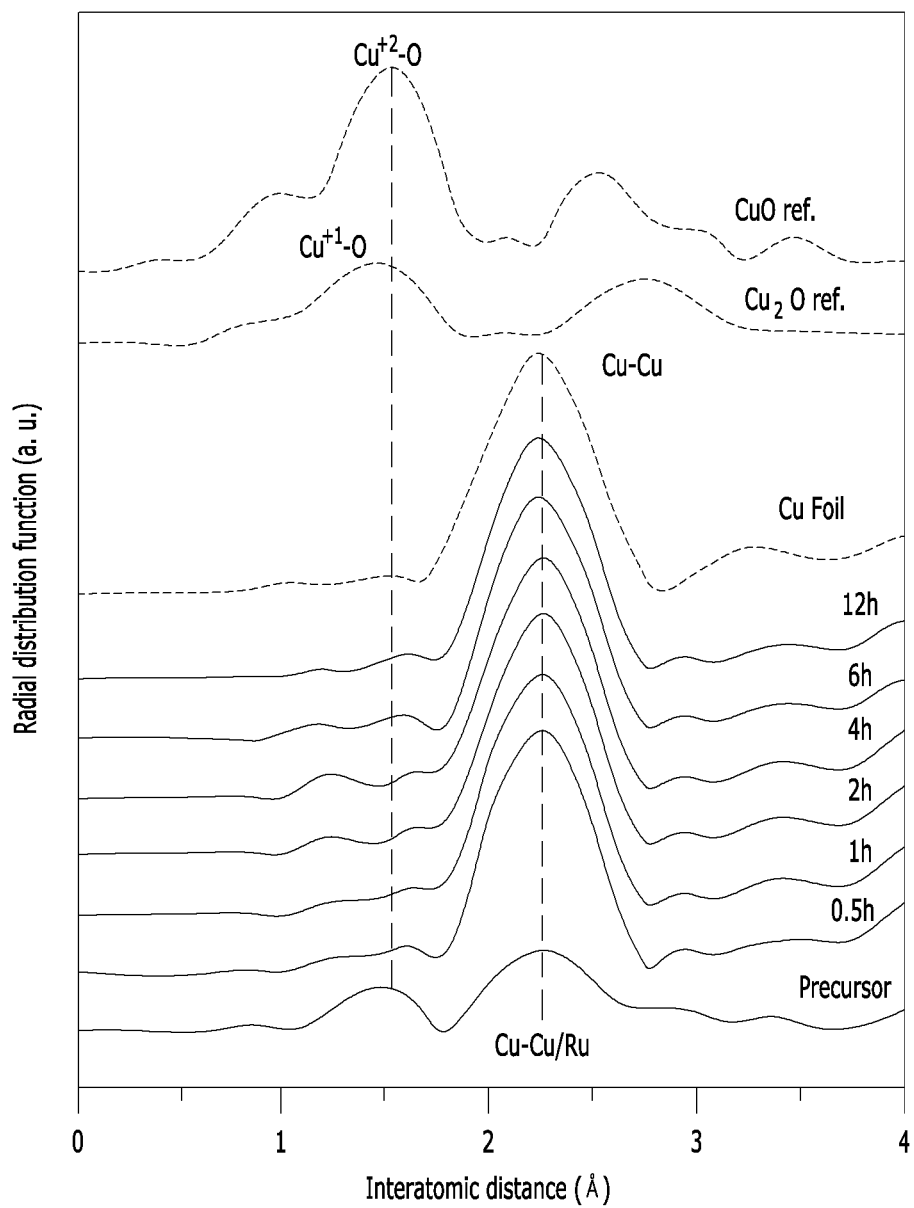

FIGS. 3A to 3C are Cu K-edge XANES spectra (FIG. 3A) and EXAFS $k^2\chi(k)$ Fourier transform (FT) spectra (FIG. 3B) of the oxy-Ru/Cu catalyst, and a heat map image (FIG. 3C) including Cu foil, $Cu_2O$, and CuO as reference.

Cu K-edge XANES spectra were recorded for all catalysts. For the precursor, the edge before absorption is exhibited to be similar to standard $Cu_2O$, and the oxidation state is exhibited to be about +2. As the reduction time increases, the pre-edge adsorption of Cu shows a gradual negative change, but is located on the right side of the Cu foil, indicating that the oxidation state of Cu is consistent with the results of XPS, but is still higher than zero. The adjustment environment is described by the Fourier transform of the extended X-ray absorption fine structure (EXAFS). In the oxy-Ru/Cu sample, only Cu—Cu bonds could be identified, and this is since EXAFS showed bulk average structural information. These indicators indicate that only partial surface Cu is present in an oxidized form, which may readily stabilize Ru atoms.

Figure 3D:
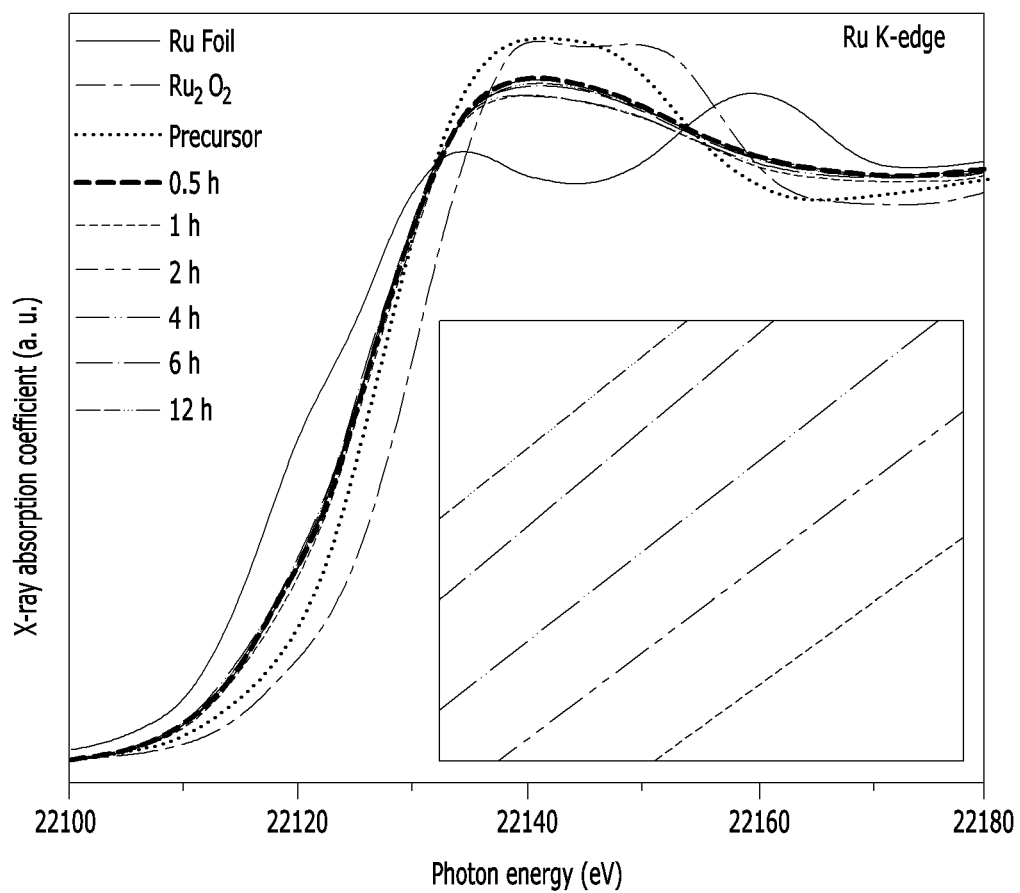
Figure 3E:
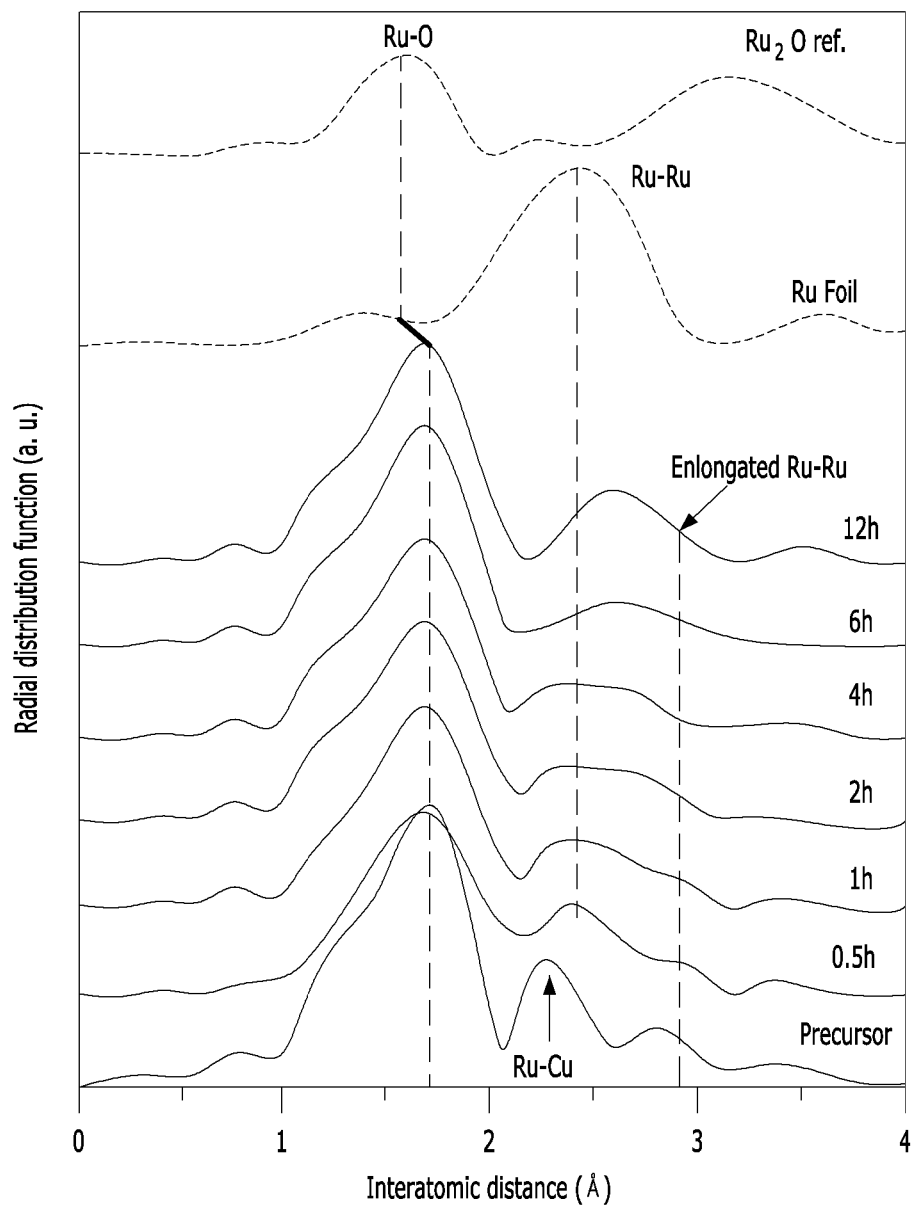

FIGS. 3D to 3F are Ru K-edge XANES spectra (FIG. 3D), EXAFS $k^2\chi(k)$ Fourier transform (FT) spectra (FIG. 3E) of the oxy-Ru/Cu catalyst, and a heat map image (FIG. 3F) including Ru foil and $RuO_2$ as reference.

Through this, it could be confirmed that the oxidation state of Ru was less than +2 using the Ru K-edge XANES of the precursor similar to the XPS results. And, the reduction process is lower but greater than zero. The EXAFS spectra demonstrate that the Ru atom is predominantly bound to the oxygen atom. Impressively, several long Ru—Ru bonds are also noticeable, meaning they belong to isolated but weakly interacting Ru atoms.

Experimental Example 4

FIG. 4 is graphs showing polarization curves, Tafel plots, and overvoltage and current density durability of a catalyst for hydrogen evolution reaction (HER) according to an example of the present application.

FIGS. 4A to 4D are graphs showing polarization curves and Tafel plots of the catalyst according to Examples of the present application at a scan rate of 5 $mVs^{-1}$ in an argon-saturated 1 M KOH solution and a PBS buffer solution.

Figure 4A:
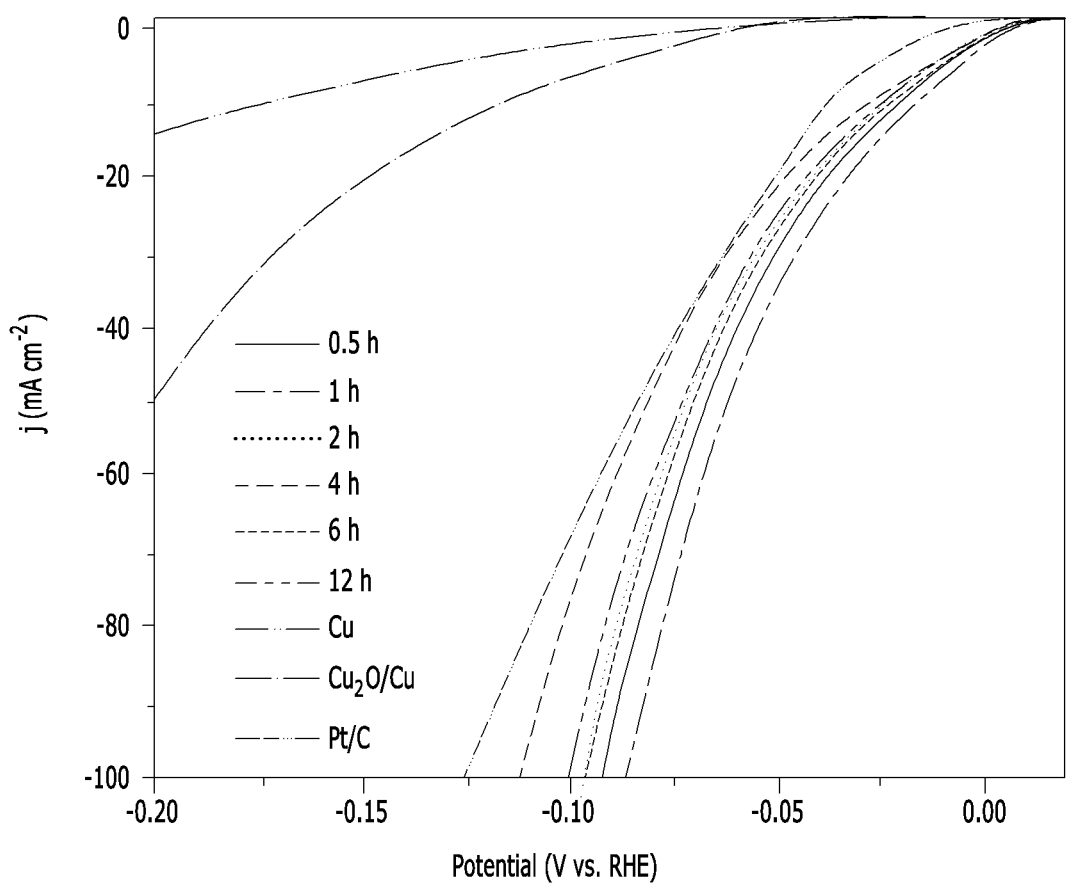
FIG. 4 is graphs showing polarization curves, Tafel plots, and overvoltage and current density durability of a catalyst for hydrogen evolution reaction (HER) according to an embodiment of the present application.
Figure 4B:
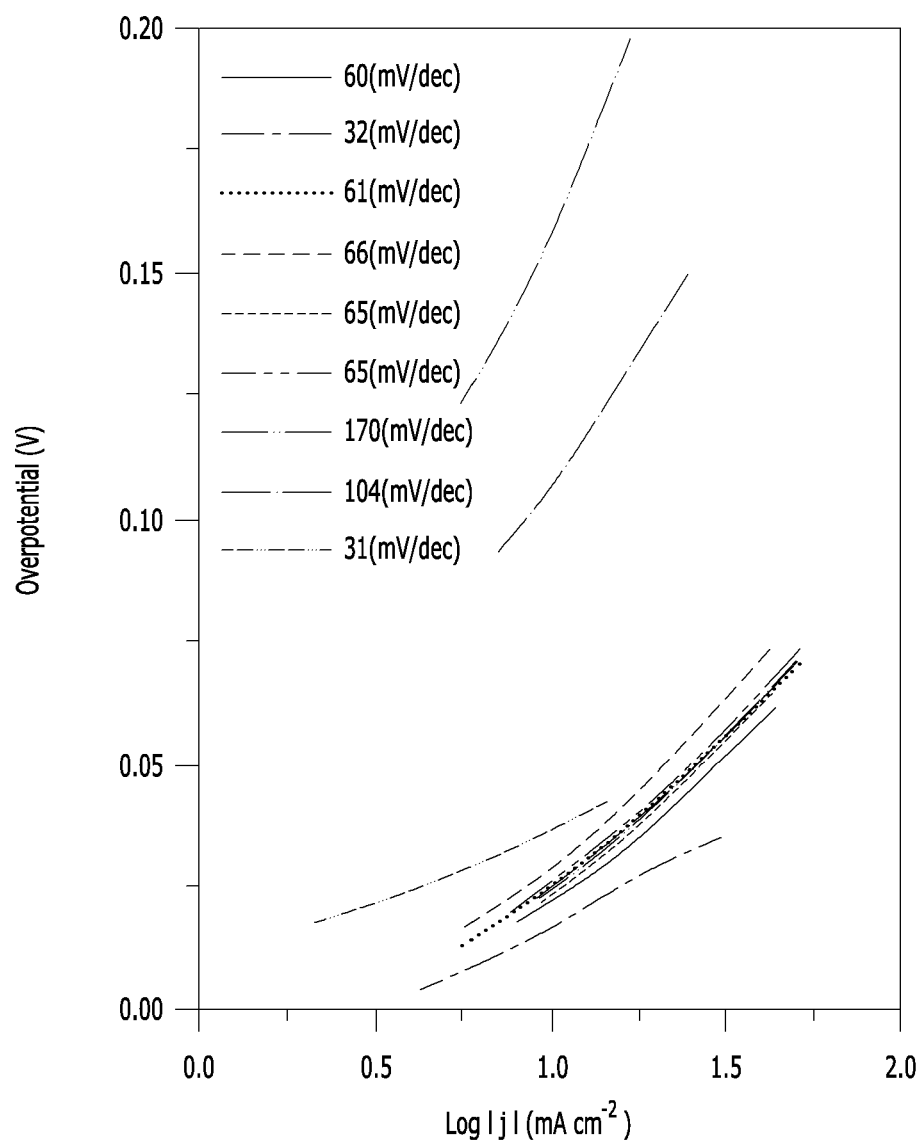
Figure 4C:
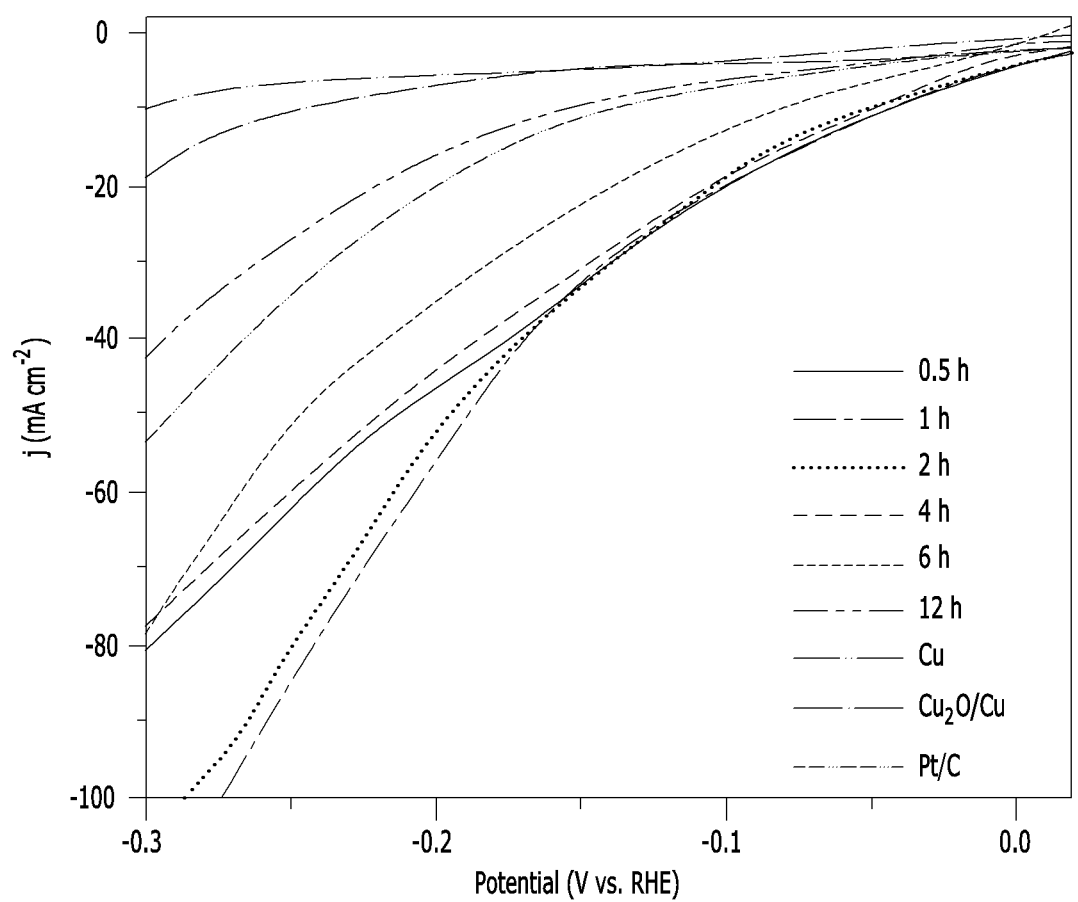
Figure 4D:
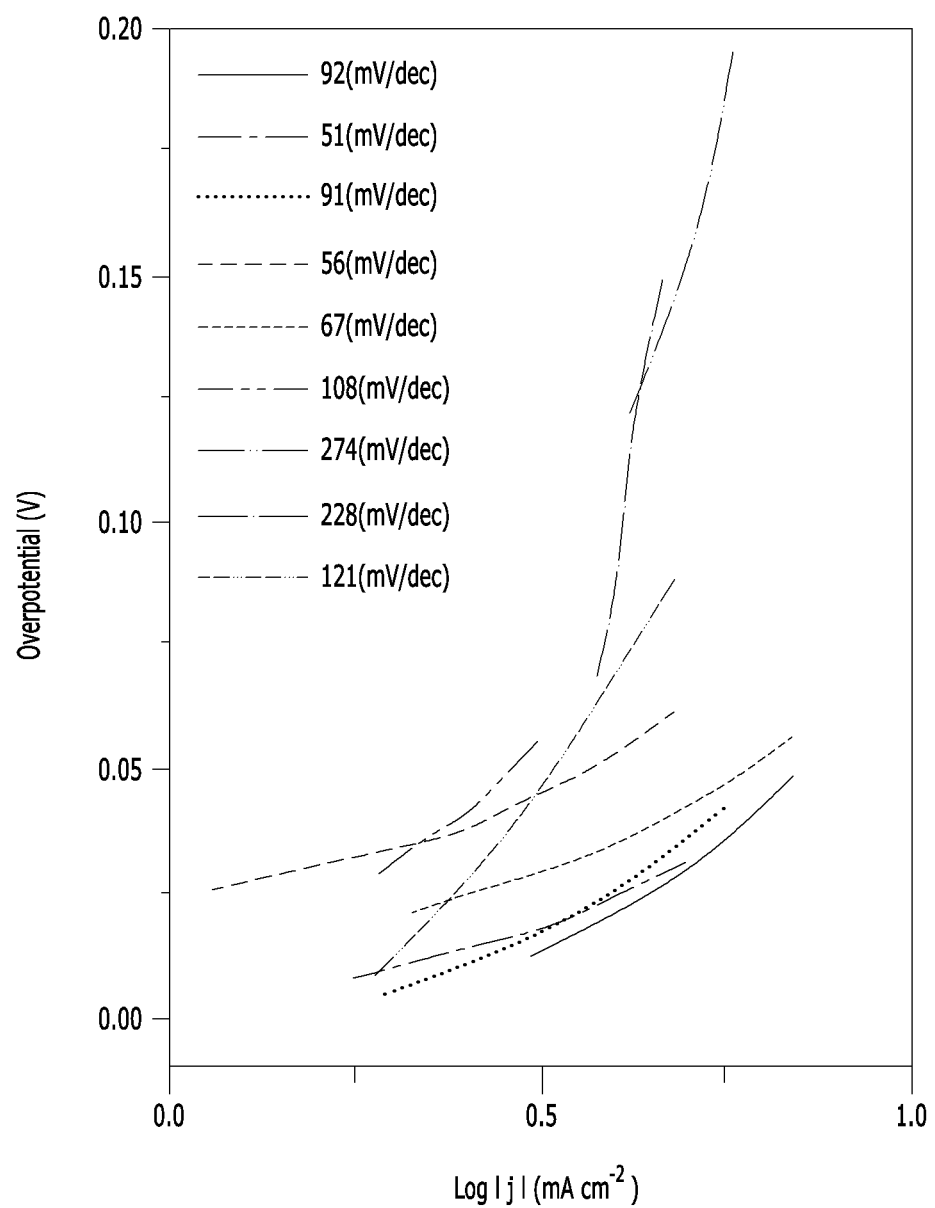
Figure 4E:
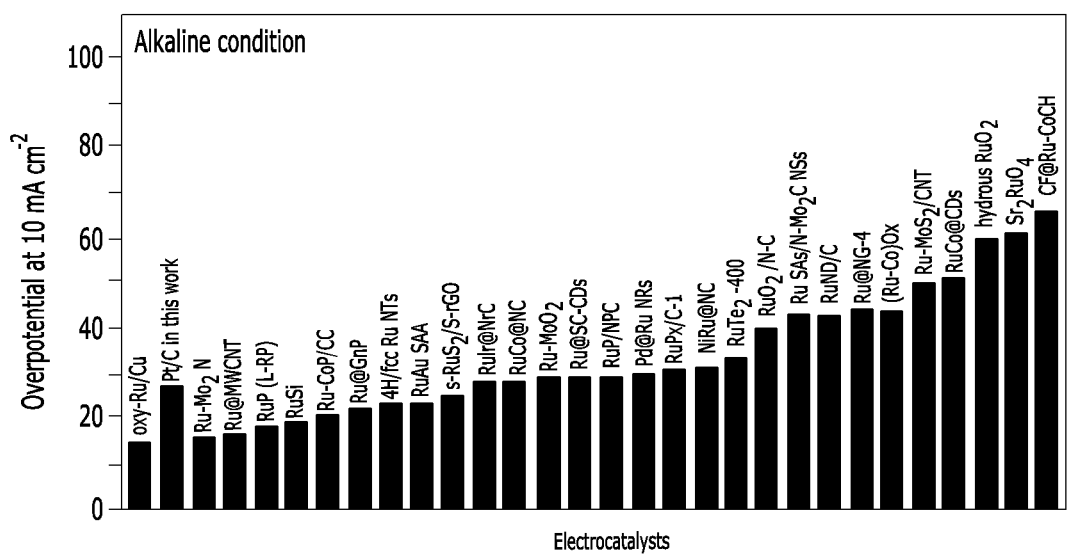

FIG. 4E is a graph comparing the overvoltages at 10 mA $cm^{-2}$ of the HER catalysts recently reported under alkaline conditions and the catalyst according to the example of the present application.

Specifically, the electrocatalytic activities of all catalysts were measured in 1.0 M KOH and PBS buffer solutions respectively.

Through this, it could be confirmed using the alkaline HER polarization curve that the performance of oxy-Ru/Cu outperformed Pt/C and could be optimized by controlling the reduction period. It was confirmed that the 1-hour sample exhibited the most excellent activity among all oxy-Ru/Cu catalysts with an ultra-low potential (15 mV) and Tafel slope (32 mV/dec) of 10 mA cm$^{-2}$, which shows the characteristics of the stage of determining the Heyrovsky-Tafel rate. What is impressive is that superiority and inferiority may be maintained in neutral electrolytic solutions with respect to a potential exceeding 45 mV and a Tafel slope of 51 mV/dec at 10 mA cm$^{-2}$. Such a value is one of the best values when it is compared to the reported Ru-based catalysts under alkaline and neutral conditions.

That is, the oxy-Ru/Cu according to the present application showed excellent HER activity and were more excellent than activities of Pt/C and almost all HER catalysts with respect to the ultra-low density potentials of 15 mV and 45 mV at a density of 10 mA cm$^{-2}$ in 1.0 M KOH each in a non-acidic electrolytic solution.

Figure 4F:
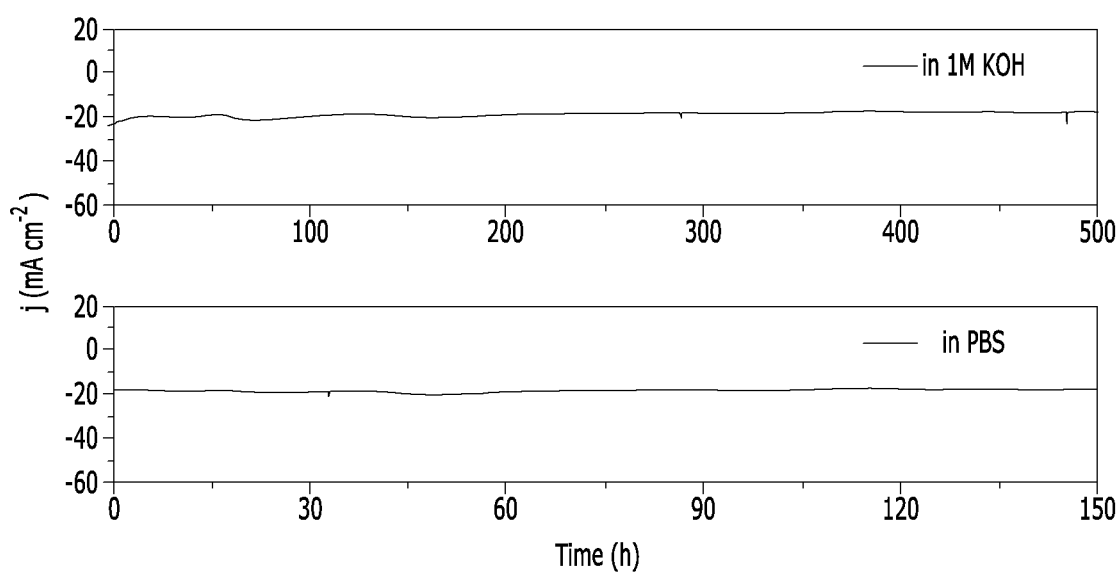

FIG. 4F is graphs showing the results of measuring the current density durability of the catalyst according to the example of the present application for 500 hours and 150 hours respectively in 1 M KOH and PBS electrolytic solution at 20 mA cm$^{-2}$.

Specifically, the durability of oxy-Ru/Cu (reduction for 1 hour) in alkaline and neutral conditions was also investigated. The density of 20 mA/cm$^{-2}$ shows little decay even after 500 hours in 1 M KOH and 150 hours in PBS respectively, and this shows future applicable potentiality.

That is, it has been confirmed that the catalyst according to the present application may maintain the durability of 20 mA cm$^{-2}$ for 500 hours in 1 M KOH, which is the best record among Cu catalysts to date.

The foregoing description of the present application is for illustration, and those with ordinary skill in the art to which the present application pertains will be able to understand that it may be easily modified into other specific forms without changing the technical spirit or essential features of the present application. Therefore, it should be understood that the embodiments described above are illustrative in all respects and not restrictive. For example, each element described as a single form may be implemented in a dispersed form, and likewise elements described in the dispersed form may also be implemented in a combined form.

The scope of the present application is indicated by the claims to be described later rather than the above detailed description, and all changes or modified forms derived from the meaning and scope of the claims and equivalent concepts thereof should be construed as being included in the scope of the present application.

What is claimed is:

1. A catalyst for hydrogen evolution reaction (HER) comprising a transition metal matrix and noble metal atoms formed in the transition metal matrix, wherein the noble metal atoms have oxygen physisorbed thereto, and the oxygen is derived from the transition metal matrix.

2. The catalyst for hydrogen evolution reaction (HER) of claim 1, wherein the transition metal matrix is produced by reducing a transition metal oxide, and oxygen is physisorbed on the noble metal atoms in the reduction process.

3. The catalyst for hydrogen evolution reaction (HER) of claim 1, wherein the noble metal atoms have hydrogen spillover occurring on the hetero-interface thereof.

4. The catalyst for hydrogen evolution reaction (HER) of claim 1, wherein the transition metal matrix has a lattice structure, and the noble metal atoms are introduced into the lattice structure.

5. The catalyst for hydrogen evolution reaction (HER) of claim 1, wherein the transition metal matrix includes a metal oxide selected from the group consisting of $Cu_2O$, $CuO$, $SnO_2$, $SnO$, $Fe_2O$, $Fe_2O_3$, $Fe_3O_4$, $FeO(OH)$, $Al_2O_3$, $NiO$, $TiO$, $TiO_2$, $WO_3$, $PbO$, $PbO_2$, $Pb_3O_4$, $ZnO$, $Sb_2O_3$, $Sb_2O_4$, $Sb_2O_5$, $Bi_2O_3$, $V_2O_3$, $V_2O_4$, $V_2O_5$, $MnO$, $Mn_3O_4$, $Mn_2O_3$, $MnO_2$, $CrO_2$, $Cr_2O_3$, $CrO_3$, $CoO$, $Co_3O$, $ZrO_2$, $Ga_2O_3$, $In_2O_3$, and combinations thereof.

6. The catalyst for hydrogen evolution reaction (HER) of claim 1, wherein the transition metal matrix includes a nanostructure selected from the group consisting of nanowires, nanorods, nanoplates, nanotubes, nanowires, and combinations thereof.

7. The catalyst for hydrogen evolution reaction (HER) of claim 1, wherein the noble metal includes one selected from the group consisting of ruthenium (Ru), gold (Au), silver (Ag), platinum (Pt), palladium (Pd), iridium (Ir), rhodium (Rh), osmium (Os), and combinations thereof.

8. A water splitting system including the catalyst for hydrogen evolution reaction (HER) according to claim 1.

9. The catalyst for hydrogen evolution reaction (HER) of claim 1, wherein the noble metal includes ruthenium (Ru).

10. The catalyst for hydrogen evolution reaction (HER) of claim 1, wherein the transition metal matrix includes copper.

11. The catalyst for hydrogen evolution reaction (HER) of claim 1, wherein the noble metal has an oxidation state of less than +2.

12. A method for preparing a catalyst for hydrogen evolution reaction (HER), the method comprising the steps of:
   immersing a transition metal matrix in a noble metal chloride solution;
   preparing an intermediate by exchanging noble metal cations of the noble metal chloride solution with a portion of metal cations of the transition metal matrix;
   immersing the intermediate in a solution containing a reducing agent; and
   forming noble metal atoms to which oxygen is physisorbed on the transition metal matrix by moving oxygen of the transition metal matrix to noble metal atoms by the reducing agent.

13. The method of claim 12, wherein the reducing agent includes one selected from the group consisting of $NaBH_4$, $LiAlH_4$, hydrazine, $KBH_4$, hydroiodic acid, and combinations thereof.

14. The method of claim 12, wherein the transition metal matrix is one which is produced by reducing a transition metal oxide, and in which oxygen is physisorbed on the noble metal atoms in the reduction process.

15. The method of claim 12, wherein the noble metal atoms have hydrogen spillover occurring on the hetero-interface thereof.

16. The method of claim 12, wherein the transition metal matrix has a lattice structure, and the noble metal atoms are introduced into the lattice structure.

17. The method of claim 12, wherein the transition metal matrix includes a metal oxide selected from the group consisting of $Cu_2O$, $CuO$, $SnO_2$, $SnO$, $Fe_2O$, $Fe_2O_3$, $Fe_3O_4$, $FeO(OH)$, $Al_2O_3$, $NiO$, $TIO$, $TiO_2$, $WO_3$, $PbO$, $PbO_2$, $Pb_3O_4$, $ZnO$, $Sb_2O_3$, $Sb_2O_4$, $Sb_2O_5$, $Bi_2O_3$, $V_2O_3$, $V_2O_4$, $V_2O_5$, $MnO$, $Mn_3O_4$, $Mn_2O_3$, $MnO_2$, $CrO_2$, $Cr_2O_3$, $CrO_3$, $CoO$, $Co_3O$, $ZrO_2$, $Ga_2O_3$, $In_2O_3$, and combinations thereof.

18. The method of claim 12, wherein the transition metal matrix includes a nanostructure selected from the group consisting of nanowires, nanorods, nanoplates, nanotubes, nanowires, and combinations thereof.

19. The method of claim 12, wherein the noble metal includes one selected from the group consisting of ruthenium (Ru), gold (Au), silver (Ag), platinum (Pt), palladium (Pd), iridium (Ir), rhodium (Rh), osmium (Os), and combinations thereof.

* * * * *